US 6,619,039 B2

(12) United States Patent
Zehnder, II et al.

(10) Patent No.: US 6,619,039 B2
(45) Date of Patent: Sep. 16, 2003

(54) BRAKE MASTER CYLINDER-SENSOR SYSTEM AND METHOD

(75) Inventors: James W. Zehnder, II, Tipp City, OH (US); Alan H. Green, Germantown, OH (US); John C. Layman, Trotwood, OH (US); Elaine A. Ruble, Bellbrook, OH (US); Schuyler S. Shaw, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 22 days.

(21) Appl. No.: 09/842,478

(22) Filed: Apr. 25, 2001

(65) Prior Publication Data

US 2002/0157394 A1 Oct. 31, 2002

(51) Int. Cl.[7] .......................... B60T 17/22; F01B 31/12
(52) U.S. Cl. ............................. 60/534; 60/545; 92/5 R
(58) Field of Search ..................... 60/534, 545; 92/5 R

(56) References Cited

U.S. PATENT DOCUMENTS

| | | | | |
|---|---|---|---|---|
| 4,914,916 A | * | 4/1990 | Leigh-Monstevens et al. | 60/534 |
| 4,918,921 A | | 4/1990 | Leigh-Monstevens et al. | |
| 5,095,702 A | * | 3/1992 | Volz | 60/545 |
| 5,713,640 A | * | 2/1998 | Feigel et al. | 60/545 |

FOREIGN PATENT DOCUMENTS

| | | |
|---|---|---|
| DE | 3918909 A1 | 12/1990 |
| DE | 19622545 A1 | 11/1997 |
| DE | 19915832 A1 | 6/2000 |
| DE | 10053995 A1 | 8/2002 |
| EP | 02076332.2 | 5/2002 |

OTHER PUBLICATIONS 02076332.2–2423– European Search Report dated May 8, 2002.

* cited by examiner

Primary Examiner—Edward K. Look
Assistant Examiner—Michael Leslie
(74) Attorney, Agent, or Firm—Scott A. McBain

(57) ABSTRACT

A brake master cylinder-sensor system and method are provided. The system includes a master cylinder, a piston slidably positioned in the master cylinder, a magnet positioned on the piston, and a sensor disposed on the master cylinder. A change of piston linear position causes a linear change in a magnetic field position sensed by the sensor, and a brake control signal proportional to the change of piston linear position is generated. A method of operating a brake master cylinder-sensor system includes applying a brake pedal force, changing a piston linear position within a master cylinder, determining a change in a linear magnetic field position proportional to the change of the piston linear position, and generating a brake control signal based on the change in the linear magnetic field position.

18 Claims, 3 Drawing Sheets

BRAKE MASTER CYLINDER-SENSOR SYSTEM AND METHOD

TECHNICAL FIELD OF THE INVENTION

The present invention relates to electro-hydraulic brake systems, and more specifically, the invention relates to an improved brake master cylinder-sensor system and method.

BACKGROUND OF THE INVENTION

Master cylinders are commonly used in various applications, particularly in automobiles where they control various vehicular systems. For example, braking systems commonly known as brake-by-wire (BBW) or similar systems typically include a master cylinder that is isolated from the braking system. Such BBW systems rely on automatic electric or electric-hydraulic means to remotely activate the brake. Slave cylinders located at the automobile wheels typically actuate a braking process. Furthermore, one or more sensors positioned to monitor vehicle brake pedal position may control the process. The sensors measure pedal movement characteristics and relay this information to the brake system. The information is used to determine the appropriate braking force and is typically proportionate to a brake pedal force.

A potential shortcoming of current automobile master cylinder assemblies relates to positioning the sensors near the brake pedal. Situating the sensors on or near the brake pedal may require additional installation time and cost. Strategies for positioning a Hall effect sensor integral to a master cylinder are known thereby simplifying the packaging of the master cylinder-sensor assembly. The Hall effect sensors are capable of detecting minute perturbations in magnetic fields. These sensors, for example, may be used to precisely measure the movement of a neighboring permanent magnet that moves in response to a brake pedal motion.

The U.S. Pat. No. 4,918,921 issued Apr. 24, 1990 to Leigh-Monstevens et al. is an example of a coaxial push rod and ball screw nut drive for a master cylinder. In the Leigh-Monstevens patent, several forms of master cylinder assemblies are disclosed, including one embodiment for use in a vehicle braking system. In the preferred form, the assembly includes an electrically driven motor, a ball screw, and a piston positioned coaxially within a master cylinder bore. During operation, the motor armature rotates thereby driving the ball screw into the piston and slidably moving the piston within the bore. The assembly may include a Hall effect sensor carried by the master cylinder. As the armature spins, the Hall effect sensor detects passage of a series of rotating circumferentially positioned permanent magnet segments. The linear position of the ball screw and piston are determined based on the rotation count measured by the sensor.

The Leigh-Monstevens patent may disclose a suitable strategy for determining the linear position of a piston within the master cylinder bore. The invention, however, requires a spinning electrical motor armature to rotate magnets in the proximity of, for example, a Hall effect sensor to read piston position. Some master cylinder assemblies do not utilize electrical motors and, thus, cannot detect piston position within the cylinder bore using this strategy. Therefore, it would be desirable to achieve a brake master cylinder capable of integral piston position measurement without the need for an electrical motor that overcomes the aforementioned and other disadvantages.

SUMMARY OF THE INVENTION

One aspect of the invention provides a brake master cylinder-sensor system comprising: a master cylinder, a piston slidably positioned in the master cylinder, a magnet positioned on the piston, and a sensor disposed on the master cylinder. A change of piston linear position causes a linear change in a magnetic field position sensed by the sensor, and a brake control signal proportional to the change of linear piston position is generated. The master cylinder may comprise a non-ferrous material. The non-ferrous material may comprise aluminum. The magnet changes linear position in response to a brake pedal movement and may be positioned in a magnetic proximity to the sensor. The magnet may comprise a permanent magnet and the sensor may comprise a Hall effect transducer. The brake control signal may be proportional to a piston linear travel, and the piston linear travel may be proportional to a brake pedal movement. The brake control signal may be sent to a vehicle brake system wherein the vehicle brake system may be activated in proportion to a brake control signal intensity.

Another aspect of the invention provides for a method of operating a brake master cylinder-sensor system comprising: applying a brake pedal force, changing a piston linear position within a master cylinder, determining a change in a linear magnetic field position proportional to the change of the piston linear position, and generating a brake control signal based on the change in the linear magnetic field position. The application of the brake pedal force may result in a linear movement of a piston within the master cylinder. Determining the change in the linear magnetic field position may further comprise repeatedly sensing a magnetic field position with a sensor. A magnet may be positioned in a magnetic proximity to the sensor and may produce the magnetic field.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
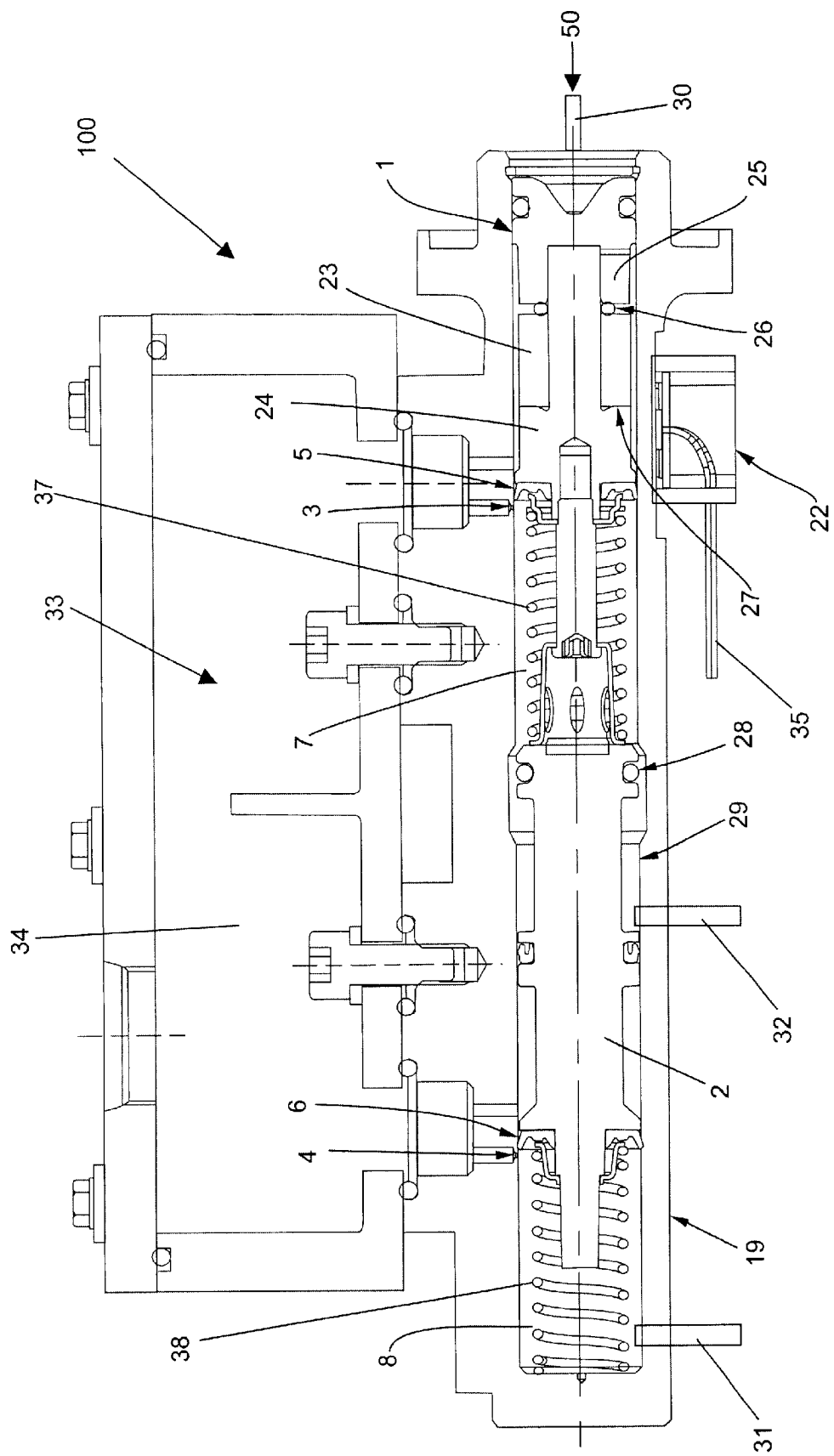
FIG. 1 is a partial fragmentary cross-sectional view of an upper portion of one embodiment of a master cylinder-sensor system.
Figure 2:
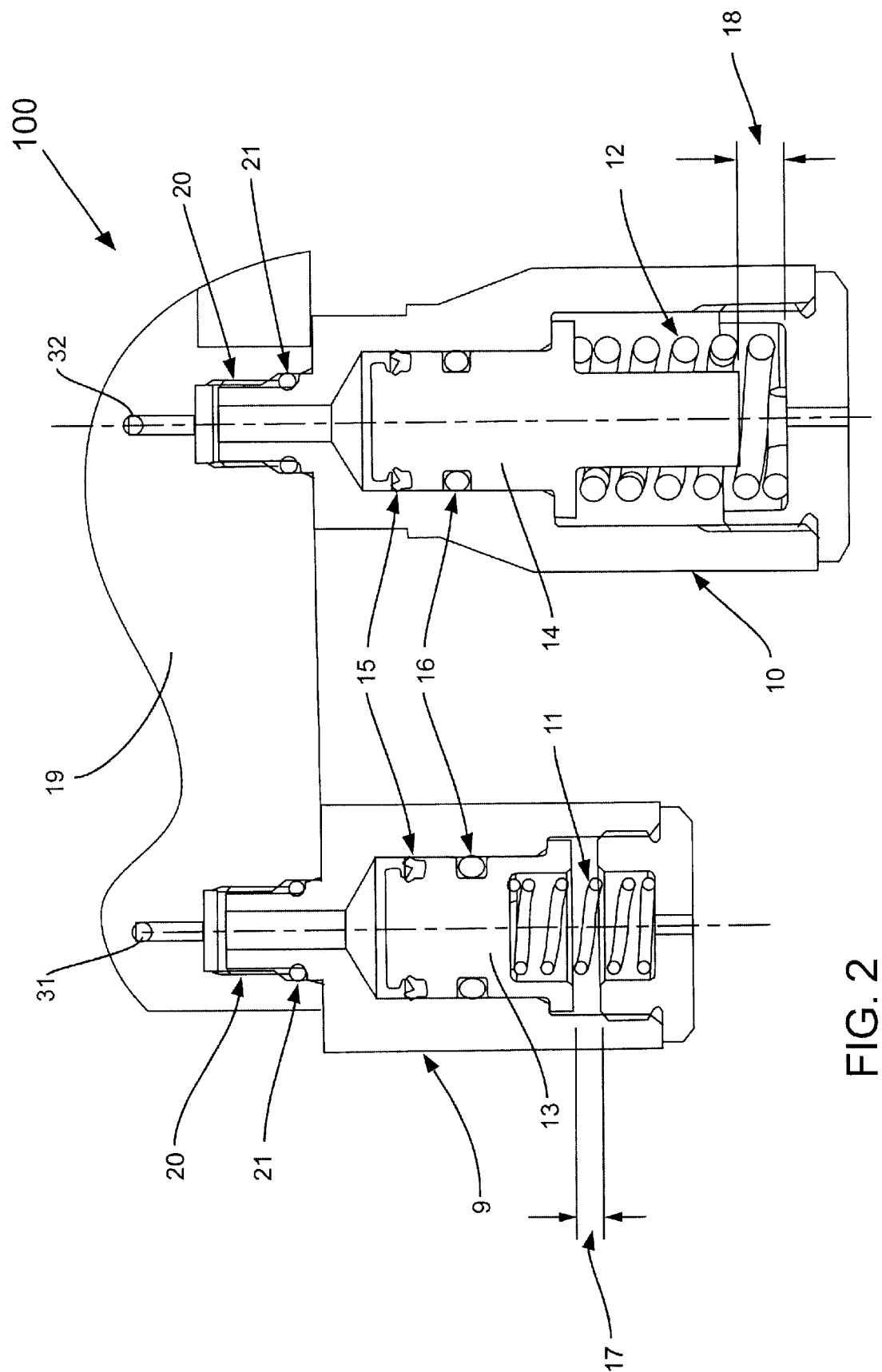
FIG. 2 is a partial fragmentary cross-sectional view of a lower portion of the embodiment of the master cylinder-sensor system of FIG. 1.
Figure 3:
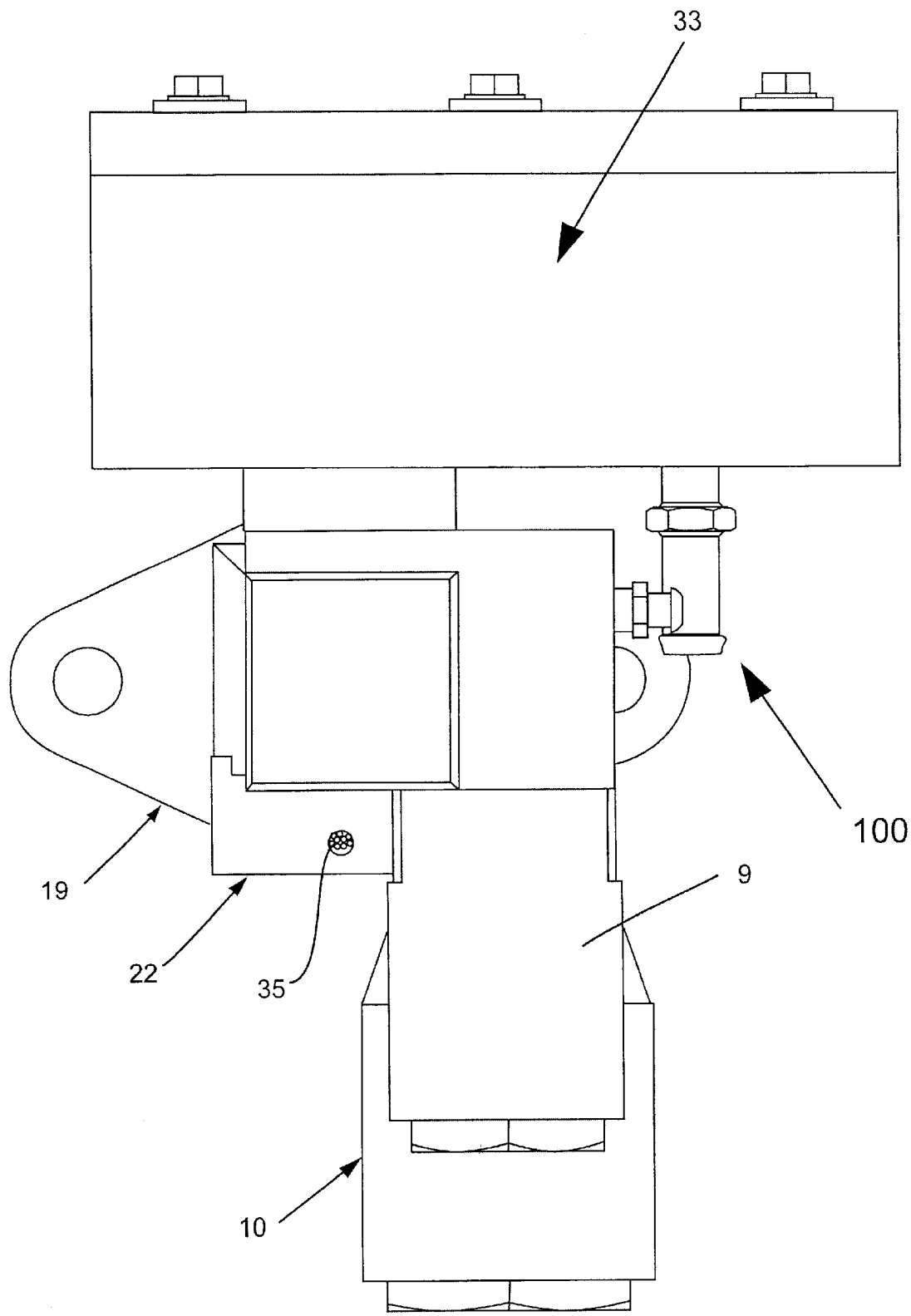
FIG. 3 is a perspective view of the embodiment shown in FIGS. 1 and 2.

Referring to the drawings, illustrated in part by FIGS. 1 and 2 and in sum by FIG. 3 is one embodiment of a brake master cylinder-sensor system in accordance with the present invention designated in the aggregate as numeral 100. The brake master cylinder-sensor system 100 includes a master cylinder 19, a primary piston 1 slidably positioned in the master cylinder 19, a magnet 23 positioned on the primary piston 1, and a sensor 22 disposed on the master cylinder 19. A change of primary piston 1 linear position causes a linear change in a magnetic field position sensed by the sensor 22, and a brake control signal proportional to the change of linear piston position is generated. For the purposes of the following description, a change in linear position constitutes a transverse lateral movement within the master cylinder 19.

In one embodiment, the master cylinder 19 may be formed of an acceptably rigid and non-ferrous material such as aluminum. A longitudinal main bore 29 extends through the master cylinder 19. The master cylinder 19 slidably carries the primary piston 1 that may be operably attached to a push rod 30. The push rod 30 exerts a force on the primary piston 1 proportionate to a force 50. The force 50 may be the result of an applied brake pedal force or other force applied to the brake master cylinder-sensor system 100. The primary piston 1 may be operably attached to a secondary piston 2 slidably carried in the main bore 29. A reservoir 33 may be associated with the master cylinder 19 and carry a fluid 34 such as a hydraulic brake fluid. The reservoir 33 provides a non-pressurized gravitational flow of fluid 34 into the master cylinder 19 through both a primary bypass hole 3 and a secondary bypass hole 4.

A primary seal 5 may be operably attached to the primary piston 1 and fluidly isolate a primary chamber 7 from the reservoir 33 upon sliding beyond the primary bypass hole 3. A secondary seal 6 may be operably attached to the secondary piston 2 and fluidly isolate a secondary chamber 8 from the reservoir 33 upon sliding beyond the secondary bypass hole 4. A primary spring 37 may be positioned in the primary chamber 7; a secondary spring 38 may be positioned in the secondary chamber 8.

The master cylinder 19 may be in fluid communication with one or more "feel" emulator devices designed to produce differential non-linear brake pedal force versus pedal travel characteristics. In one embodiment, as shown in FIG. 2, a primary emulator assembly 10 and a secondary emulator assembly 9 may provide an appropriate pedal "feel" characteristic. The primary emulator assembly 10 may contain a primary emulator piston 14 and primary emulator spring 12. The secondary emulator assembly 9 may contain a secondary emulator piston 13 and secondary emulator spring 11.

The primary and secondary emulator assemblies 10,9 may include a lip seal 15 and a secondary emulator o-ring seal 16 to assure that fluid 34 is sealed in the device and that air does not enter the device during vacuum evacuation. The primary and secondary emulator assemblies 9,10 may be attached to the master cylinder 19 by a threaded connection 20 and sealed with a primary emulator o-ring seal 21. A primary emulator port 32 and a secondary emulator port 31 may permit the fluid 34 to flow between the master cylinder 19 and the primary and secondary emulator assemblies 9,10.

The sensor 22 may be attached to a flat surface on one side of the master cylinder 19 by threaded fasteners (not shown) and to a brake system (not shown) via one or more wires 35. The integral placement of the sensor 22 with the master cylinder simplifies the packaging of the brake master cylinder-sensor system 100 and may reduce overall installation time and cost. The sensor may be a Hall effect transducer commonly used to continuously detect magnetic field flux. The sensor 22 interacts with a magnetic field produced by the magnet 23 positioned on the primary piston 1. In one embodiment, the sensor does not contact the magnet directly; the sensor 22 detects the magnetic field through the body of the master cylinder 19 and is therefore in a magnetic proximity to the sensor. The magnet 23 may be a permanent magnet with a bar or hollow cylindrical shape.

The generated brake control signal may be proportional to a primary piston linear travel; the primary piston linear travel may be proportional to a brake pedal (not shown) movement. In one embodiment, the sensor 22 may detect a primary piston linear travel of 25 to 30 cm or more. The brake control signal may be sent electrically to a vehicle brake system (not shown) via one or more wires 35. Furthermore, the vehicle brake system may be activated in proportion to a brake control signal intensity. In one embodiment, the brake control signal intensity generated by a Hall effect sensor is positively correlated to the progressive increase in the brake pedal force and movement. Thus, the vehicle brake system may be activated in proportion to the brake pedal force.

The present invention achieves an integral piston linear position measurement without the need for an electrical motor. Furthermore, the present invention allows for variations that permit detection of a change of the piston linear position by sensing a linear change in a magnetic field position. For example, several master cylinder assemblies currently available may be adapted to carry a magnet on one or more pistons within the master cylinder. Additionally, a sensor, such as a Hall effect transducer, may be positioned on the master cylinder body to detect the linear movement of the magnet and associated magnetic field thereby producing a signal relating to a force applied to the assembly.

The primary piston 1 may consist of a front piston 24 including a shoulder 27 portion and a rear piston 25 that are press fit together after the magnet 23 and a primary master cylinder o-ring seal 26 are installed onto the front piston 24. The primary master cylinder o-ring seal 26 may be squeezed during assembly and maintains contact between the magnet 23 and the shoulder 27 of the front piston 24.

Operation of one embodiment includes applying a brake pedal force 50, changing the primary piston 1 linear position within the master cylinder 19, determining a change in a linear magnetic field position proportional to the change of the primary piston 1 linear position, and generating a brake control signal based on the change in the linear magnetic field position. The application of the brake pedal force 50 may result in a linear movement of the primary piston 1 within the master cylinder 19. The determining the change in the linear magnetic field position may further comprise repeatedly sensing a magnetic field position with a sensor 22. The magnet 23 may be positioned in a magnetic proximity to the sensor 22 and may produce the magnetic field.

A force 50 produced by a brake pedal movement may be applied to the push rod 30 and transmitted to the primary piston 1 and the secondary piston 2. The applied force 50 results in a slidable linear movement of the primary piston 1 and secondary piston 2 thereby compressing the primary spring 37 and secondary spring 38, respectively. As the magnet 23 is positioned on the primary piston 1, a linear position of the magnet 23 and its associated magnetic field within the main bore 29 is changed with a brake pedal movement. The primary and secondary pistons 1,2 move to the left direction (consistent with FIG. 1) with the applied force 50. As the force 50 increases, a primary and secondary seals 5,6 slide beyond the primary and secondary bypass holes 3,4. At this point, pressure begins to build in the primary and secondary chambers 7,8. Because the device may be hydraulically isolated during normal powered operation, fluid 34 moves from the secondary chamber 8 into the secondary emulator assembly 9 through the secondary emulator port 31. The secondary emulator piston 13 compresses the secondary emulator spring 11 as the fluid 34 pressure is diverted into the secondary chamber 8. A characteristic stage of emulator travel is produced relating to one spring rate and until a secondary emulator travel distance 17 is consumed.

As the force 50 increases, sufficient pressure is generated in the primary chamber 7 for fluid 34 to move into the primary emulator assembly 10 through the primary emulator port 32. The primary emulator piston 43 compresses the primary emulator spring 12 as the fluid 34 pressure is diverted into the primary chamber 7. Another characteristic stage of emulator travel is produced relating to another spring rate and until a primary emulator travel distance 18 is consumed. One skilled in the art will recognize that the emulator characteristics may be modified to suit various needs. For example the onset of travel and/or rate of the springs 12,11,37,38 may be based on a vehicle specific pedal "feel" requirements; the primary and secondary emulator travels 18,17 may also be based on varying "feel" requirements. Alternatively, emulators using gas or bellows compression or other emulation means may be utilized to generate a desired "feel" and used in conjunction or in place of spring emulators.

In an alternative embodiment, such as with no-power operation, the brake master cylinder-sensor system 100 is not hydraulically isolated. Fluid 34 from the primary chamber 7 and the secondary chamber 8 may be directed into the wheel brakes (not shown) and the primary and secondary emulator assemblies 10,9. An additional travel of the secondary piston assembly 2 allows a lockout o-ring seal 28 to enter the main bore 29 and reduces the travel associated with the primary emulator assembly 10. The process results in less total pedal travel during no-power operation.

While the embodiment of the invention disclosed herein is presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A brake master cylinder-sensor system comprising:
   a master cylinder;
   a piston slidably positioned in the master cylinder;
   a magnet positioned on the piston; and
   a sensor disposed on the master cylinder; wherein a change of piston linear position causes a linear change in a magnetic field position sensed by the sensor, and a brake control signal proportional to the change of piston linear position is generated; wherein the brake control signal is proportional to a piston linear travel and the piston linear travel is proportional to a brake pedal movement.

2. The system of claim 1 wherein the master cylinder comprises a nonferrous material.

3. The system of claim 2 wherein the non-ferrous material comprises aluminum.

4. The system of claim 1 wherein the magnet changes linear position in response to a brake pedal movement.

5. The system of claim 1 wherein the magnet is positioned in a magnetic proximity to the sensor.

6. The system of claim 1 wherein the magnet comprises a permanent magnet.

7. The system of claim 1 wherein the sensor comprises a Hall effect transducer.

8. The system of claim 1 wherein the brake control signal is sent to a vehicle brake system.

9. The system of claim 8 wherein the vehicle brake system is activated in proportion to a brake control signal intensity.

10. A method of operating a brake master cylinder-sensor system comprising:
    applying a brake pedal force;
    changing a piston linear position within a master cylinder;
    determining a change in a linear magnetic field position proportional to the change of the piston linear position; and
    generating a brake control signal based on the change in the linear magnetic field position; wherein the brake control signal is proportional a linear piston travel and the linear piston travel is proportional to a brake pedal movement.

11. The method of claim 10 wherein the application of the brake pedal force results in a linear movement of a piston within the master cylinder.

12. The method of claim 10 wherein the determining the change in the linear magnetic field position further comprises repeatedly sensing a magnetic field position with a sensor.

13. The method of claim 12 wherein the sensor comprises a Hall effect transducer.

14. The method of claim 12 wherein the magnetic field is produced by a magnet.

15. The method of claim 14 further comprising positioning the magnet in a magnetic proximity to the sensor.

16. The method of claim 10 further comprising sending the brake control signal to a brake system of a vehicle.

17. The system of claim 16 further comprising activating the brake system in proportion to a brake control signal intensity.

18. A brake master cylinder-sensor system comprising:
    means for applying a brake pedal force;
    means for changing a piston linear position within a master cylinder;
    means for determining a change in linear magnetic field position; and
    means for generating a brake control signal based on the change in the linear magnetic field position; wherein the brake control signal is proportional a linear piston travel and the linear piston travel is proportional to a brake pedal movement.

* * * * *